US012398724B2

(12) United States Patent
Kalb et al.

(10) Patent No.: US 12,398,724 B2
(45) Date of Patent: Aug. 26, 2025

(54) CENTRIFUGAL PUMP FOR CONVEYING MEDIA CONTAINING SOLIDS

(71) Applicant: KSB SE & Co. KGaA, Frankenthal (DE)

(72) Inventors: Juergen Kalb, Frankenthal (DE); Markus Pittroff, Frankenthal (DE); Frank Riedelbauch, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 0 days.

(21) Appl. No.: 18/012,699

(22) PCT Filed: Jun. 10, 2021

(86) PCT No.: PCT/EP2021/065640

§ 371 (c)(1),
(2) Date: Dec. 23, 2022

(87) PCT Pub. No.: WO2021/259658

PCT Pub. Date: Dec. 30, 2021

(65) Prior Publication Data

US 2023/0258195 A1 Aug. 17, 2023

(30) Foreign Application Priority Data

Jun. 26, 2020 (DE) ..................... 10 2020 003 847.6

(51) Int. Cl.
*F01D 5/14* (2006.01)
*F04D 7/04* (2006.01)
(Continued)

(52) U.S. Cl.
CPC ............. *F04D 29/026* (2013.01); *F04D 7/04* (2013.01); *F04D 29/2227* (2013.01);
(Continued)

(58) Field of Classification Search
CPC ............... F04D 29/026; F04D 29/2294; F05D 2300/224; F05D 2230/90; F05D 2300/611; F05D 2300/10
(Continued)

(56) References Cited

U.S. PATENT DOCUMENTS 2,547,786 A * 4/1951 Seinfeld .............. F04D 29/2216 416/182
3,156,190 A * 11/1964 Stahle ................... F04D 29/183 415/72
(Continued)

FOREIGN PATENT DOCUMENTS

CN 104265680 A 1/2015
DE 44 09 278 A1 9/1995
(Continued)

OTHER PUBLICATIONS

International Search Report (PCT/ISA/210) issued in PCT Application No. PCT/EP2021/065640 dated Sep. 21, 2021 with English translation (five (5) pages).
(Continued)

*Primary Examiner* — Logan M Kraft
*Assistant Examiner* — James J Kim
(74) *Attorney, Agent, or Firm* — Crowell & Moring LLP

(57) ABSTRACT

A centrifugal pump has an open impeller conveying media containing solids with at least one blade that projects in the direction of an inflow. The surface of the open impeller is at least partially provided with a carbon layer, preferably a tetrahedral hydrogen-free amorphous carbon layer. A surface of an adjacent wear plate may also be coated with tetrahedral hydrogen-free amorphous carbon layer.

14 Claims, 6 Drawing Sheets

(51) Int. Cl.
*F04D 29/02* (2006.01)
*F04D 29/22* (2006.01)

(52) U.S. Cl.
CPC ..... *F04D 29/2244* (2013.01); *F04D 29/2294* (2013.01); *F05D 2230/90* (2013.01); *F05D 2300/224* (2013.01)

(58) Field of Classification Search
USPC ...................................................... 416/223 R
See application file for complete search history.

(56) References Cited

U.S. PATENT DOCUMENTS

| | | | | |
|---|---|---|---|---|
| 4,076,179 | A * | 2/1978 | Tsukube | F04D 7/045 241/46.11 |
| 4,427,336 | A * | 1/1984 | Lake | F04D 29/2216 416/176 |
| 5,795,540 | A | 8/1998 | Dwars et al. | |
| 7,458,765 | B2 * | 12/2008 | Stiles | B23K 26/34 415/200 |
| 10,989,579 | B2 * | 4/2021 | Nakaoka | G01F 1/698 |
| 2005/0227078 | A1 * | 10/2005 | Power | F04D 29/324 428/408 |
| 2006/0207540 | A1 * | 9/2006 | Matsui | F01L 1/16 123/90.49 |
| 2007/0078067 | A1 * | 4/2007 | Nakagawa | C10M 137/10 508/363 |
| 2007/0186424 | A1 * | 8/2007 | Becker | B26B 21/60 30/294 |
| 2011/0280718 | A1 | 11/2011 | Yonehara | |
| 2013/0140776 | A1 * | 6/2013 | Kennedy | C23C 16/44 427/299 |
| 2014/0140835 | A1 | 5/2014 | Embrey et al. | |
| 2016/0177959 | A1 | 6/2016 | Marya et al. | |
| 2016/0312789 | A1 | 10/2016 | Moon | |
| 2018/0187692 | A1 | 7/2018 | Christ et al. | |
| 2020/0407856 | A1 * | 12/2020 | Guenther | C23C 28/347 |
| 2021/0231217 | A1 * | 7/2021 | Pittroff | F16J 15/34 |
| 2023/0400026 | A1 * | 12/2023 | Wilkström | F04D 29/167 |

FOREIGN PATENT DOCUMENTS

| | | | |
|---|---|---|---|
| DE | 43 26 545 | C2 | 8/1996 |
| DE | 10 2015 212 203 | A1 | 1/2017 |
| DE | 10 2013 200 680 | B4 | 8/2017 |
| DE | 10 2017 221 930 | A1 | 6/2019 |
| DE | 10 2017 223 602 | A1 | 8/2019 |
| DE | 10 2019 005 469 | A1 | 2/2021 |
| EP | 1 616 100 | B1 | 2/2010 |
| EP | 2 570 674 | A1 | 3/2013 |
| WO | WO 95/25826 | | 9/1995 |
| WO | WO 2004/065796 | A1 | 8/2004 |

OTHER PUBLICATIONS

German-language Written Opinion (PCT/ISA/237) issued in PCT Application No. PCT/EP2021/065640 dated Sep. 21, 2021 (five (5) pages).
German-language Search Report issued in German Application No. 10 2020 003 847.6 dated Jun. 15, 2021 with partial English (13 pages).
Cover page of EP 0750686 A1 published Sep. 28, 1995 (one (1) page).

* cited by examiner

CENTRIFUGAL PUMP FOR CONVEYING MEDIA CONTAINING SOLIDS

CROSS REFERENCE TO RELATED APPLICATION

This application claims priority under 35 U.S.C. § 119 from German Patent Application No. 102020003847.6, filed Jun. 26, 2020, the entire disclosure of which is herein expressly incorporated by reference.

BACKGROUND AND SUMMARY OF THE INVENTION

The invention relates to a centrifugal pump for conveying media containing solids, having an open impeller which comprises at least one vane which projects in the direction of an inflow.

An example of a medium containing solids is waste water, in particular municipal and industrial waste water. This generally includes untreated waste water (e.g. sewage, excrement), waste water (mechanically purified water from sedimentation tanks), sludge (e.g. activated, fresh, digested and seed sludge) and rainwater. Industrial waste water can in some circumstances have a very corrosive or abrasive action on the centrifugal pumps that are used.

In centrifugal pumps for conveying media containing solids, different impellers can be used, for example channel impellers, vortex impellers or single-vane impellers. Channel impellers are open or closed impellers with a reduced number of vanes. One, two or three vane(s) in a radial or mixed-flow arrangement have been found to be successful.

Centrifugal pumps with vortex impellers are also used for conveying media containing solids. Such pumps are also referred to as vortex pumps, the conveying capacity of which is transmitted from a rotating rear shroud equipped with straight or curved vanes, the so-called vortex impeller, to the flowing medium. The vortex impeller is a radial impeller which has a large passage for the solids contained in the medium to be conveyed and which has little susceptibility to faults.

WO 2004/065796 A1 describes a centrifugal pump having a vortex impeller for conveying liquids mixed with solid admixtures. Between the vortex impeller and the suction-side casing wall there is a space, so that solids are able to pass through the vortex pump without clogging. The transition from the suction-side casing wall to the wall of the casing space situated radial to the vortex impeller takes place in a stepless manner. The casing space is of asymmetric form.

EP 1 616 100 B1 describes a centrifugal pump having a vortex impeller, the impeller of which consists of a rear shroud equipped with open vanes. The vanes have different heights. A suction-side casing wall extends conically. The distance of the casing wall from the leading edges of the higher vanes of the impeller decreases with the diameter. A passage with a minimum extent follows, constantly, a leading edge of a vane of lower height which is inclined towards the impeller outlet.

Ball passage refers to a free, unrestricted impeller passage. It defines the maximum permissible diameter of the solids in order to ensure passage without clogging. It is given as the ball passage in millimeters. The ball passage corresponds at the maximum to the nominal width of the suction or discharge nozzle. In order that this maximum possible ball passage is achieved in conventional vortex pumps, the distance of the vane front from the suction-side casing wall must likewise correspond at least to the nominal width of the suction or discharge nozzle inside the casing too.

If the vane-free space between the vane front and the opposite casing wall exceeds a certain amount, the efficiency of the centrifugal pump having a vortex impeller is reduced. The greater the distance between the vortex impeller and the suction-side casing wall, the lower the efficiency of the centrifugal pump having a vortex impeller.

The vane shape also plays a crucial role in the configuration of open impellers. The construction of the leading edge in particular is of great importance. In the case of waste water pumps, the leading edge frequently becomes covered with fibers that are present in the medium to be conveyed. The fibers are often not transported away from the impeller leading edges because, owing to the flow resistance on the intake side and the discharge side, the respective resistances are in equilibrium. If there is an accumulation of fibers at the leading edges, further fibers can accumulate, so that larger accumulations can form. This behavior is encouraged in particular when high ball passages are ensured.

The large flow cross-sections necessary for a sufficiently large ball passage encourage the build-up of accumulations. In particular at partial load, for example small volume flows, large flow cross-sections lead to dead water zones through which there is no flow. The dead water zones lead to clogging.

In the case of single-vane impellers, such accumulations have the result that a higher power is required to operate the centrifugal pump. In multi-vane impellers, the accumulations can also result in an asymmetric flow in the channels. Such asymmetric flows have an impact not only on the required power but also on the conveyed volume flow and the head.

DE 10 2017 221 930 A1 describes an impeller for a centrifugal pump which has at least one vane which points in the direction of an inflow. The angle at which the vane projects from the rear shroud is optimized such that deposits can effectively be avoided.

DE 10 2015 212 203 A1 describes a vortex impeller of a centrifugal pump for conveying media containing solids, the vanes of which are arranged in bundles. A sufficient ball passage with high conveying efficiency is thereby achieved.

DE 44 09 278 A1 and EP 0 750 686 A1 disclose a white cast iron with a composition, in wt. %, of Cr=26 to 36, Ni≤10, Mo=2 to 6, Cu≤3, N≤0.2, Si≤1.5, Mn≤1.5, V=4 to 9, C=1.4 to 1.9, remainder iron and impurities resulting from the melting. This white cast iron is distinguished by high corrosion resistance in aggressive media while at the same time having high wear resistance.

Generally, cast components are frequently used in centrifugal pumps. In casting, a solid body of the desired form is obtained from a liquid material after solidification. The desired casing structures or impellers or other components of the centrifugal pump can thus be produced in a targeted manner. Cast materials in centrifugal pump construction are generally iron-carbon alloys.

In particular in the case of centrifugal pumps which are used for conveying media containing solids, wear phenomena and/or corrosion phenomena frequently occur in the region of the components that come into contact with the medium to be conveyed. The flowing solids can remove the materials of the open impellers and of the wear plates, whereby the gap therebetween becomes larger with increasing operation. The pump efficiency thereby decreases with the duration of operation until the impeller and the wear plate must be replaced as a result of abrasive wear.

DE 43 26 545 C2, DE 10 2013 200 680 B4 and DE 10 2017 223 602 A1 describe cast components, such as, for example, impellers and wear plates, which are based on ceramics, in particular based on silicon carbide. Compared to components of gray cast iron, these are significantly harder and increase the service life. However, these components are considerably more complex and expensive to manufacture, wherein they still do not achieve a service life having the desired extent.

The object of the invention is to provide a centrifugal pump having an impeller for conveying media containing solids. Damage to the impeller by abrasive wear is to effectively be reduced. In addition, the pump is to be able to maintain efficient operation for a long time. The centrifugal pump is to be distinguished by high reliability and a long service life. It is additionally to ensure easy installation. Furthermore, the centrifugal pump is to be convincing because its production costs are as low as possible.

This object is achieved according to the invention by a centrifugal pump for conveying media containing solids having the features of the independent claim. Preferred variants are to be found in the dependent claims, the description and the figures.

According to the invention, the open impeller of a centrifugal pump for conveying media containing solids is coated on the surface, in particular the cast surface, with a carbon layer. The hardness of the impeller surface is thereby increased considerably, whereby efficient protection against abrasive wear by the flowing solids particles of the medium to be conveyed is obtained.

In particular the impeller flanks and specifically the front-end vane edges of the open impeller are provided according to the invention with a carbon layer. Depending on the type of centrifugal pump, specifically the front-end vane edges are exposed to abrasive stress and are protected particularly well by the carbon layer.

According to the invention there is used for conveying media containing solids a centrifugal pump having an open diagonal single-vane impeller which is provided with a carbon layer. In this impeller, the flow line of the vane extends obliquely outwards. Unpurified, solids-laden and gas-emitting waste water and also media with relatively high viscosity can advantageously be conveyed thereby.

In a variant of the invention, the centrifugal pump for conveying media containing solids is equipped with a vortex impeller. Such an impeller has vanes which can be arranged at an equal distance from one another or are combined into bundles. Each bundle thereby comprises at least two vanes. Bundles each having two or three vanes have been found to be particularly advantageous. In a variant of the invention, each bundle comprises four vanes. The rear shroud of the vortex impeller has a hub projection which is formed on the suction side and on which the vanes engage. The vanes protrude from the rear shroud in the direction of the suction side and have a profile which is curved contrary to the direction of rotation. All the vanes can thereby have the same curvature. In an alternative variant, the vanes have different curvatures. Vanes with different curvatures can thus be arranged within a bundle, for example. The vanes of the vortex impeller, in particular the vane flanks and the front-end vane edges, are advantageously provided with a carbon layer.

In a centrifugal pump for conveying media containing solids, the open impeller cooperates with a counter-element. According to the invention, such a counter-element can be a wear plate and/or a suction-side casing part. It is particularly advantageous to coat the wear plate and/or the suction-side casing part with carbon, whereby effective protection against abrasive wear is obtained and as long an operating time as possible with constant efficiency of the pump is made possible.

In an advantageous variant of the invention, the open impeller, in particular the open diagonal single-vane impeller, coated with carbon has a cutting edge for cutting long-fiber solids constituents into shorter segments and avoiding clogging in the pump chamber.

In a particularly advantageous embodiment of the invention, the open impeller is formed in one piece with at least one vane. It is thereby found to be advantageous if the impeller and/or the vane(s) are made from a metallic material. A cast material is preferably used. This open impeller of cast material is then provided according to the invention with a carbon layer.

The carbon layers are understood as being layers in which carbon is the main component. The carbon layer can be applied, for example, by a PVD (physical vapor deposition) method, for example by evaporation or sputtering, or a CVD (chemical vapor deposition) method.

The carbon layer is preferably an amorphous carbon layer, in particular a tetrahedral hydrogen-free amorphous carbon layer, which is also referred to as a ta-C layer. The covalent bonds belonging to the crystal lattice of graphite (in each case 3 in total) are characterized with the designation "sp2". sp2-Hybridization is thereby present.

In the case of a diamond layer, each carbon atom forms a tetrahedral arrangement with four adjacent atoms. In this spatial arrangement, all the interatomic distances are equally small. Very high binding forces therefore act between the atoms, specifically in all spatial directions. This results in the high strength and extreme hardness of diamond. The covalent bonds belonging to the crystal lattice of diamond, in each case four in total, are characterized with the designation "sp3". sp3-Hybridization is thus present.

In a particularly advantageous variant of the invention, the carbon layer consists of a mixture of sp3- and sp2-hybridized carbon. This layer is characterized by an amorphous structure. Foreign atoms such as hydrogen, silicon, tungsten or fluorine can also be incorporated into this carbon network.

The arrangement according to the invention of a carbon layer on an open impeller and a counter-element, such as, for example, a wear plate, leads to a considerable reduction in abrasive removal.

The arrangement of a carbon layer on an open impeller creates a smooth axial surface with anti-adhesion properties without the necessity for complex mechanical post-processing of the impeller. Furthermore, a plurality of open impellers can be placed in a coating reactor, which is preferably in the form of a vacuum chamber, where the ta-C coating is applied under moderate thermal loading. The centrifugal pump according to the invention having an open impeller is thus distinguished by relatively low production costs.

In a particularly advantageous variant of the invention, the carbon layer is applied as a coating to an impeller and to a wear plate and/or a suction-side casing part. The thickness of the layer is advantageously more than 0.5 μm, preferably more than 1.0 μm, in particular more than 1.5 μm. It is further found to be advantageous if the carbon layer is less than 18 μm, preferably less than 16 μm, in particular less than 14 μm.

A layer thickness of between 4 and 12 μm is desirable for protection against particle wear and tarnishing.

Ideally, the coating of carbon has an extremely smooth axial surface with anti-adhesion properties, in which the roughness average Ra of the carbon layer is less than 0.7 μm, preferably less than 0.5 μm, in particular less than 0.3 μm.

The ta-C coating has a very low coefficient of friction while at the same time having very good chemical resistance. The hardness of the coating is very similar to the hardness of diamond, wherein the hardness is preferably more than 20 GPa, preferably more than 30 GPa, in particular more than 40 GPa, and less than 120 GPa, preferably less than 110 GPa, in particular less than 100 GPa.

With on average 40 to 75 GPa, ta-C coatings are harder than a-C:H layers. In addition, ta-C does not contain hydrogen. It is therefore to be assumed that ta-C is more resistant than a-C:H when in contact with water (at temperatures above 80° C.). ta-C could likewise be more resistant than a-C:H when in contact with other—in particular polar—fluids which contain molecules in which hydrogen is bound.

The carbon layer is preferably not applied directly to the impeller, but an adhesion promoter layer is first provided. The adhesion promoter layer preferably consists of a material which both adheres well to steel and prevents carbon diffusion, e.g. by the formation of stable carbides. Thin layers of chromium, titanium or silicon are suitably used as adhesion promoter layers which meet these requirements. Chromium carbide and tungsten carbide in particular have been found to be successful as adhesion promoters.

In an advantageous variant of the invention, the coating has an adhesion promoter layer which preferably comprises a chromium material. The adhesion promoter layer preferably consists of more than 30 wt. %, preferably more than 60 wt. %, in particular more than 90 wt. %, chromium.

The ta-C coating according to the invention is a simple and economical coating, which can be produced quickly, for open impellers in centrifugal pumps. In addition to very good hardness, the coating according to the invention also has outstanding slip properties and good chemical resistance.

The invention additionally makes it possible to coat impeller geometries with special dimensions. Moreover, it is possible to produce impeller geometries which, for reasons related to manufacture, could previously only be produced from ceramics materials with a high outlay. In particular, most metallic materials are distinguished by higher ductility in direct comparison with a ceramics material.

The reason for the advantage of the higher hardness as a result of the ta-C coating is that small and large solids particles which are often contained in the media containing solids can now have a greatly reduced abrasive action on the impeller. As a result of the flow, such solids particles normally act as an abrasive. Impellers, wear plates and/or suction-side casing parts which are coated with ta-C have an extremely hard protective layer against abrasion, whereby the period of time for which they can be used to convey media containing solids is significantly increased.

PECVD/PACVD methods can preferably be used for the coating. Plasma excitation of the gas phase is thereby effected by the coupling in of pulsed DC, medium-frequency (KHz range) or high-frequency (MHz range) power. The coupling in of pulsed DC has additionally been found to be successful for reasons of maximum process variability with different workpiece geometries and loading densities.

PVD methods are ideally used for the coating. Such methods are particularly simple and have a low process temperature. This technology yields layers into which foreign atoms may also be incorporated if required. The process is preferably conducted such that structural and dimensional changes of the materials to be coated (metallic materials, gray cast iron, etc.) are ruled out.

Compared to a CVD diamond layer, the ta-C coating has the advantage that the coating temperature for CVD diamond layers is from 600 to 1000° C. and for amorphous carbon layers such as ta-C is significantly below 500° C. This is of high technical relevance in particular for the coating of metallic materials. The production of PVD diamond layers is not possible.

In a particularly advantageous embodiment of the invention, the single-vane impeller is of open diagonal form. In an alternative embodiment of the invention, it is also found to be advantageous if the impeller is in the form of a radial impeller, in particular a vortex impeller. The impeller can also have more than one vane. In a specific variant of the invention, the impeller has exactly two vanes. The described form offers the possibility of configuring the impeller both as a vortex impeller and as an open impeller.

Further features and advantages of the invention will become apparent from the description of exemplary embodiments with reference to the drawings and from the drawings themselves.

DETAILED DESCRIPTION

Figure 1:
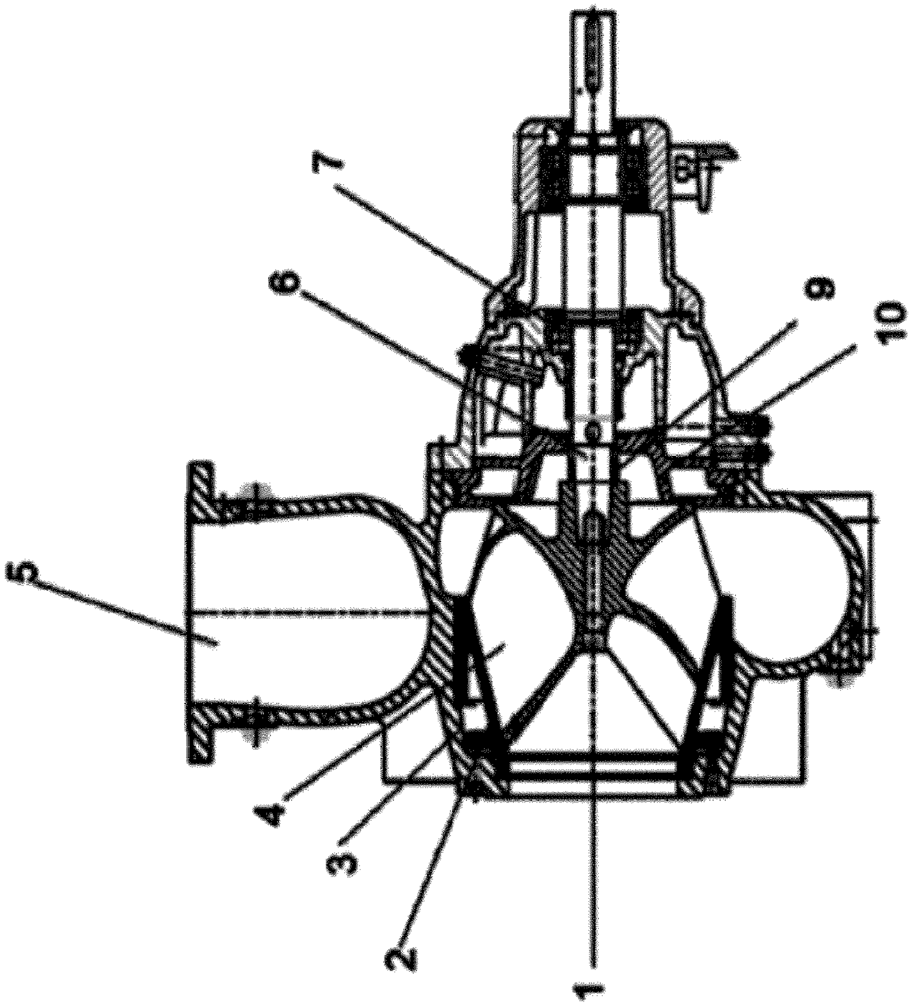
FIG. 1 is a sectional view of a centrifugal pump for conveying media containing solids, having an open diagonal single-vane impeller, in accordance with an embodiment of the present invention.

FIG. 1 is a sectional view through a centrifugal pump for conveying media containing solids. In this exemplary embodiment, the pump is a horizontally installed volute casing pump 3 having an open diagonal single-vane impeller. The medium containing solids flows into the pump via the suction port 1, is subjected to kinetic energy by the open diagonal single-vane impeller 4, which is connected in a rotationally fixed manner to the shaft 6, and leaves the pump casing 3 via the discharge nozzle 5. The shaft 6 is rotatably mounted by the ball bearing 7 and the shaft seal 9. The bearing support cover 10 closes the pump chamber in the drive direction.

Figure 2:
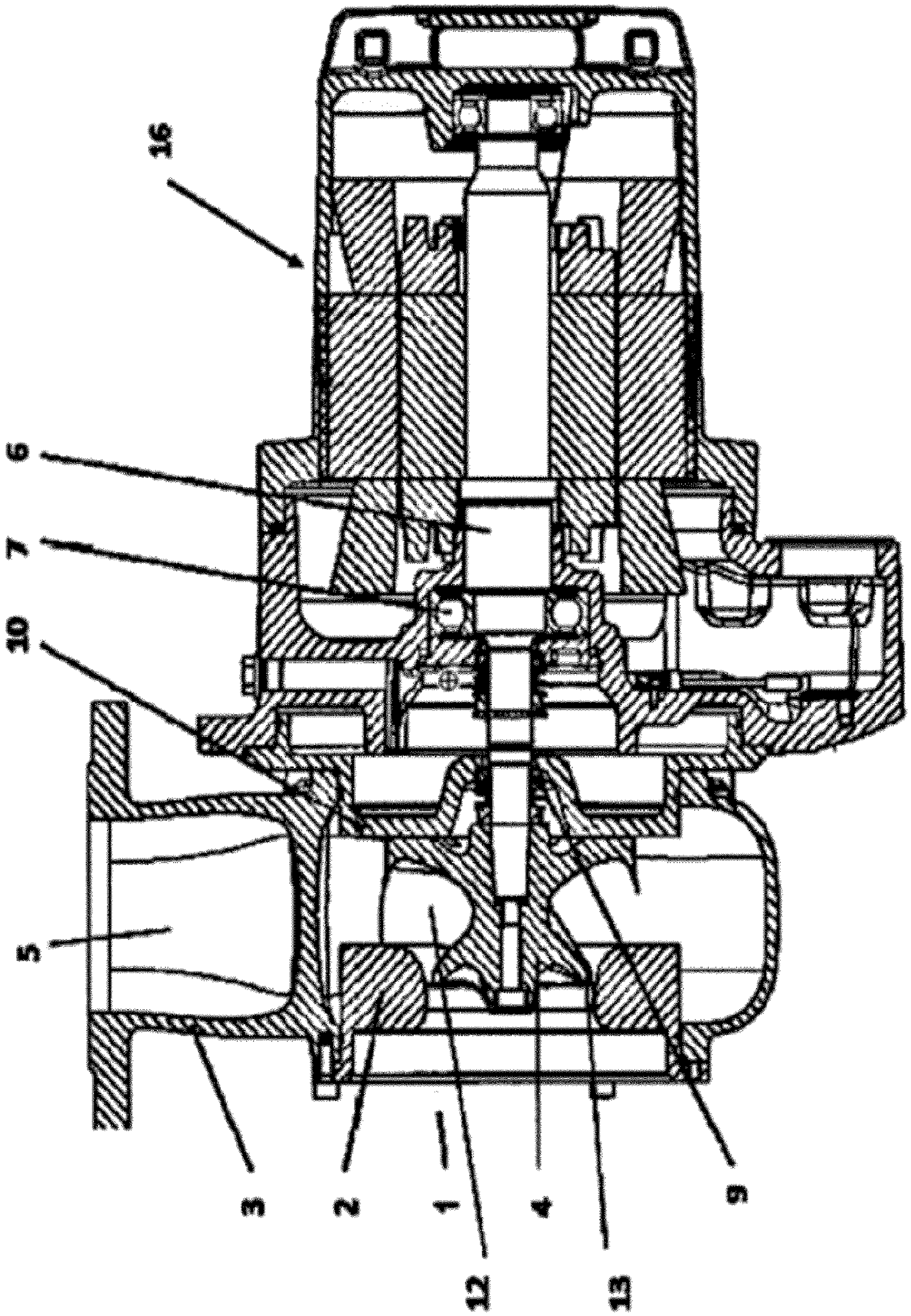
FIG. 2 is a sectional view of a centrifugal pump for conveying media containing solids, having an open impeller in accordance with an embodiment of the present invention.

FIG. 2 is a sectional view through a centrifugal pump for conveying media containing solids. In this exemplary embodiment, the pump is a submersible motor pump. The waste water mixed with admixtures enters the pump through the suction port 1. The open impeller 4 is connected in a rotationally fixed manner to a shaft 6 which sets the open impeller 4 in rotation. The open impeller 4 is arranged in a pump casing 3 which in the exemplary embodiment is in the form of a volute casing. An insert, which in the exemplary embodiment is in the form of a wear plate 2 or wear ring, projects into the suction port 1 of the pump. The shaft 6 is set in rotation by a drive 16, which in the exemplary embodiment is in the form of an electric motor. The pump casing 3 is closed by a casing cover 10. The casing cover 10 is sealed with respect to the shaft 6 by a shaft seal 9. The vane flanks 12, the vane edges 13 and the wear plate 2 are preferably coated with a carbon layer.

Figure 3:
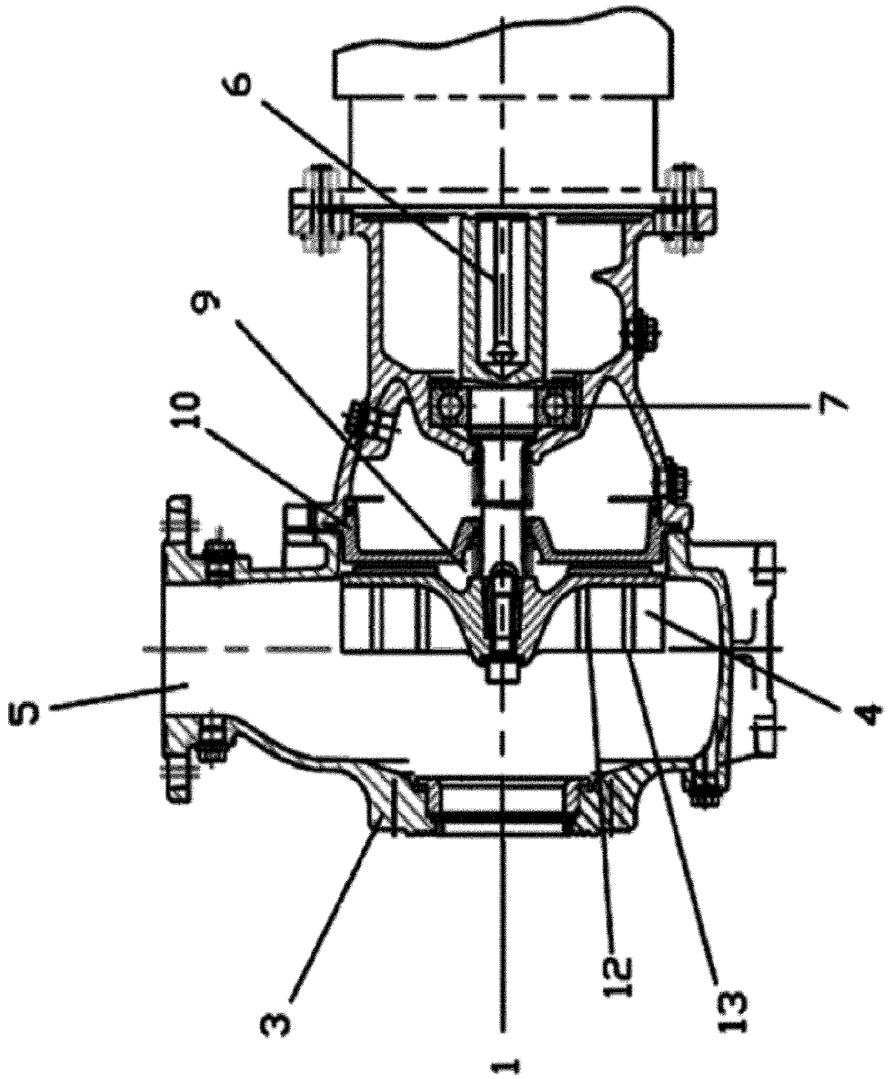
FIG. 3 is a sectional view of a centrifugal pump for conveying media containing solids, having a vortex impeller in accordance with an embodiment of the present invention.

FIG. 3 is a sectional view through a centrifugal pump for conveying media containing solids. In this exemplary embodiment, the pump is a horizontally installed volute casing pump having a vortex impeller 4. The medium containing solids enters the pump through the suction port 1. The vortex impeller 4 is connected in a rotationally fixed manner to a shaft 6 which sets the vortex impeller 4 in rotation.

Figure 4:
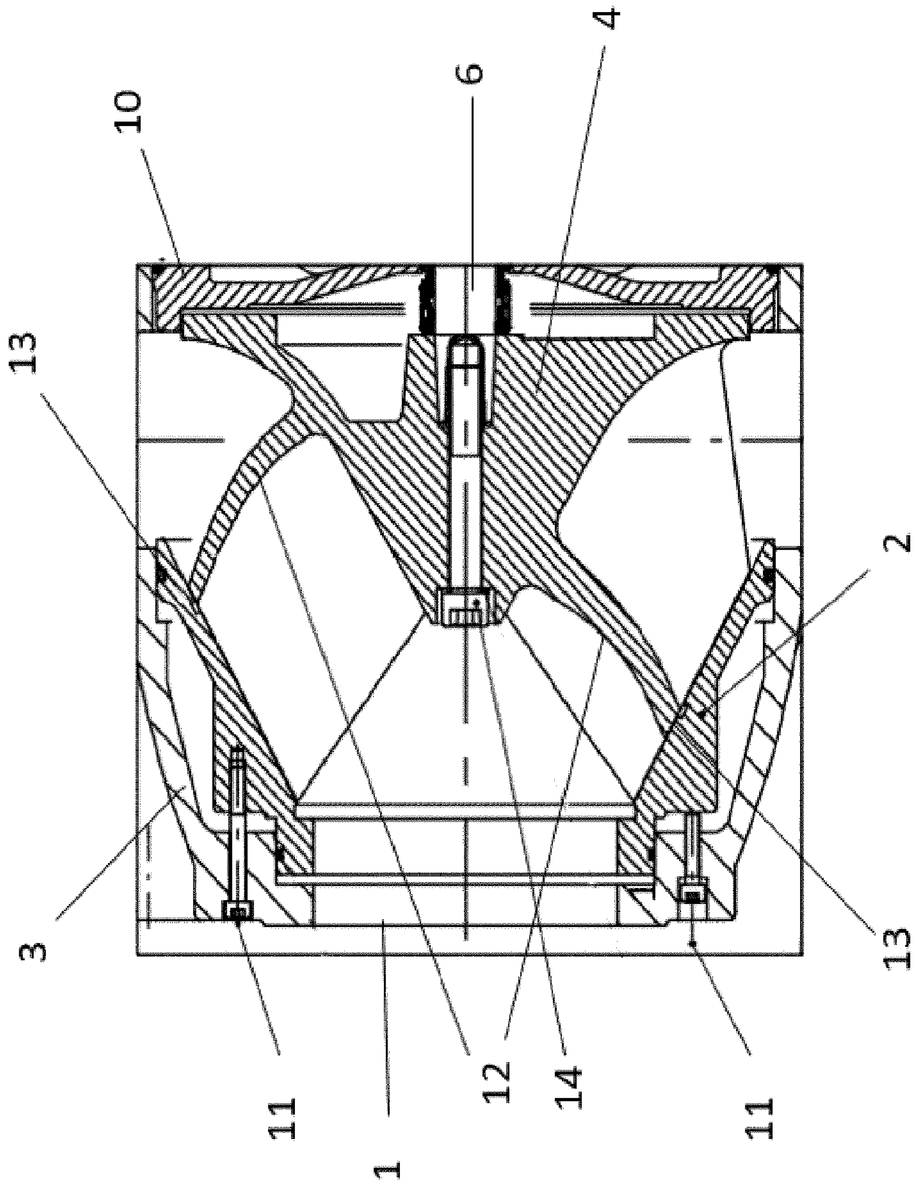
FIG. 4 is a detail section of an open diagonal single-vane impeller having a wear plate as in FIG. 1.

FIG. 4 is a detail section of an open diagonal single-vane impeller 4 having a corresponding wear plate 2 according to the illustration in FIG. 1. Ideally, the vane flanks 12, the vane edges 13 and the wear plate 2 are coated with a carbon layer, preferably with an amorphous carbon layer, in particular with ta-C. Particularly ideal protection against abrasive wear, which inevitably affects the vane flanks 12, the vane edges 13 and the wear plate 2 during the conveying of media containing solids, is thereby achieved.

Figure 5:
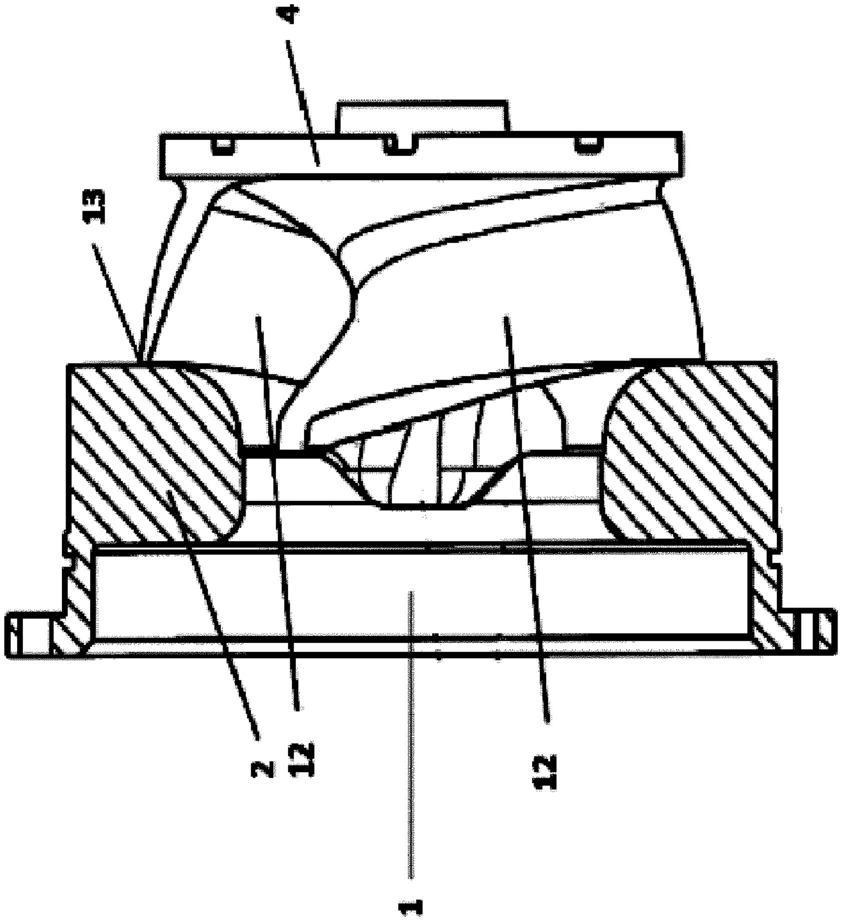
FIG. 5 is a detail section of an open impeller having a wear plate as in FIG. 5.

FIG. 5 is a detail section of the suction port region according to the illustration in FIG. 2. The open impeller cooperates with the counter-element, which in the exemplary embodiment is in the form of the wear plate 2. The vane flanks 12 of the open impeller 4 extend, starting from the hub, radially outwards with a backward curved profile. The vane edges 13 form a gap with the wear plate 2. According to the invention, the vane flanks 12, the vane edges 13 and the wear plate 2 are coated with a carbon layer, in particular with ta-C. Effective protection against abrasive wear and also against tarnishing of the two components is thereby ensured.

Figure 6:
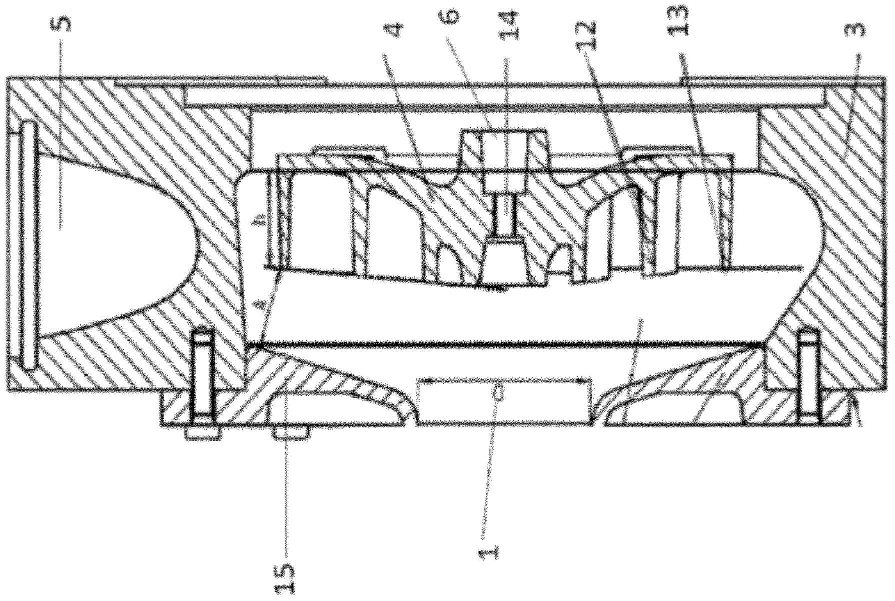
FIG. 6 is a detail section of a vortex impeller as in FIG. 3.

FIG. 6 is a detail section of the exemplary embodiment of the vortex pump according to the illustration in FIG. 3, in the casing 3 of which there is positioned a vortex impeller 4. The vortex impeller 4 is connected in a rotationally fixed manner to a shaft 6. A hub body, which has a hole 14 into which a screw is screwed, serves for fastening the vortex impeller 4. A plurality of vanes, which each comprise vane flanks 12 and vane edges 13, are arranged on a rear shroud of the vortex impeller 4. The suction port 1 is formed by a suction-side casing part 15. The suction port 1 forms an inlet for the medium containing solids. According to the invention, the vane flanks 12, the vane edges 13 and the suction-side casing part 15 are advantageously coated with a carbon layer, preferably with an amorphous carbon layer, in particular with ta-C. Very particularly ideal protection against abrasive wear, which inevitably affects the vane flanks 12, the vane edges 13 and the suction-side casing part 15 during the conveying of media containing solids, is thereby achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A waste water centrifugal pump for conveying media containing solids, comprising:

an open impeller having at least one vane which projects in a direction of an inflow, wherein a surface of the impeller is provided at least in part with a PVD or CVD, amorphous carbon layer, the waste water is sewage water, a thickness of the amorphous carbon layer is more than 0.5 μm and less than 18 μm, the open impeller is an open diagonal single-vane impeller which is provided with the carbon layer, and the amorphous carbon layer is directly in contact with an adhesion promoter layer composed of more than 90 wt %, chromium.

2. The waste water centrifugal pump as claimed in claim 1, wherein vane flanks and front-end vane edges of the open impeller are provided at least in part with a carbon layer.

3. The waste water centrifugal pump as claimed in claim 2, wherein the open impeller cooperates with a counter-element facing an inlet side of the open impeller.

4. The waste water centrifugal pump as claimed in claim 3, wherein a surface of the counter-element is provided at least in part with a carbon layer.

5. The waste water centrifugal pump as claimed in claim 4, wherein the counter-element is a wear plate.

6. The waste water centrifugal pump as claimed in claim 5, wherein the counter-element is a suction-side casing part.

7. The waste water centrifugal pump as claimed in claim 3, wherein the open impeller is formed in one piece with at least one vane.

8. The waste water centrifugal pump as claimed in claim 3, wherein the open impeller, the at least one vane, or both the open impeller and the at least one vane are made from a metallic material.

9. The waste water centrifugal pump as claimed in claim 1, wherein the carbon layer is an amorphous carbon layer.

10. The waste water centrifugal pump as claimed in claim 9, wherein the carbon layer is a tetrahedral hydrogen-free amorphous carbon layer.

11. The waste water centrifugal pump as claimed in claim 10, wherein a thickness of the carbon layer is more than 1.5 μm and less than 14 μm.

12. The waste water centrifugal pump as claimed in claim 10, wherein a surface hardness of at least a portion of the surface of the open impeller that is coated with the carbon layer and at least a portion of the surface of the counter-element is more than 20 GPa and less than 120 GPa.

13. The waste water centrifugal pump as claimed in claim 10, wherein a surface hardness of at least a portion of the surface of the open impeller that is coated with the carbon layer and at least a portion of the surface of the counter-element is more than 40 GPa and less than 100 GPa.

14. The waste water centrifugal pump as claimed in claim 10, wherein a thickness of the carbon layer is more than 11 μm and less than 14 μm.

* * * * *